United States Patent
Kim et al.

(10) Patent No.: US 9,137,673 B2
(45) Date of Patent: Sep. 15, 2015

(54) INTERFERENCE CONTROL SYSTEM FOR SIMULTANEOUSLY SUPPORTING LOW POWER COMMUNICATION AND HIGH SPECTRAL EFFICIENT COMMUNICATION

(75) Inventors: Sung Jin Kim, Suwon-si (KR); Tae In Hyon, Hwaseong-si (KR); Ki Ho Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 164 days.

(21) Appl. No.: 13/358,215

(22) Filed: Jan. 25, 2012

(65) Prior Publication Data
US 2012/0188992 A1 Jul. 26, 2012

(30) Foreign Application Priority Data

Jan. 26, 2011 (KR) ........................ 10-2011-0007803

(51) Int. Cl.
| | |
|---|---|
| *H04W 4/00* | (2009.01) |
| *H04W 16/14* | (2009.01) |
| *H04W 72/08* | (2009.01) |
| *H04W 84/18* | (2009.01) |
| *H04W 88/06* | (2009.01) |
| *H04L 29/06* | (2006.01) |

(52) U.S. Cl.
CPC ............... *H04W 16/14* (2013.01); *H04L 69/14* (2013.01); *H04W 4/006* (2013.01); *H04W 72/082* (2013.01); *H04W 84/18* (2013.01); *H04W 88/06* (2013.01)

(58) Field of Classification Search
USPC .......................................... 370/328, 329, 338
See application file for complete search history.

(56) References Cited

U.S. PATENT DOCUMENTS

| | | | |
|---|---|---|---|
| 7,444,121 B2 | 10/2008 | Brethour et al. | |
| 2006/0217067 A1 | 9/2006 | Helbig | |
| 2007/0109973 A1 | 5/2007 | Trachewsky | |
| 2008/0219193 A1* | 9/2008 | Tang et al. | 370/310 |
| 2009/0190633 A1 | 7/2009 | Smith | |
| 2010/0035627 A1* | 2/2010 | Hou et al. | 455/452.2 |
| 2011/0188393 A1* | 8/2011 | Mallik et al. | 370/252 |

FOREIGN PATENT DOCUMENTS

| | | |
|---|---|---|
| EP | 1 717 997 A1 | 11/2006 |
| KR | 10-2008-0035609 A | 4/2008 |
| KR | 10-2009-0104482 A | 10/2009 |

\* cited by examiner

*Primary Examiner* — Yemane Mesfin
*Assistant Examiner* — Jeff Banthrongsack
(74) *Attorney, Agent, or Firm* — NSIP Law

(57) ABSTRACT

Provided are a method and apparatus for controlling signal interference between networks in a personal area network. In one embodiment, an interference control apparatus may include: a cooperation determining unit configured to determine whether to perform a wireless cooperation with a neighboring mobile hub that manages a neighboring sensor node, based on a magnitude of an interference signal from the neighboring sensor node; a transmitter configured to transmit, to the neighboring mobile hub via a first communication link, first information received from a target sensor node; a receiver configured to receive the first information from the target sensor node via a second communication link, and to receive second information from the neighboring mobile hub via the first communication link; and a decoding unit configured to perform wireless cooperative multi-user decoding based on the first information and the second information.

29 Claims, 11 Drawing Sheets

INTERFERENCE CONTROL SYSTEM FOR SIMULTANEOUSLY SUPPORTING LOW POWER COMMUNICATION AND HIGH SPECTRAL EFFICIENT COMMUNICATION

CROSS-REFERENCE TO RELATED APPLICATION(S)

This application claims the benefit under 35 U.S.C. §119(a) of Korean Patent Application No. 10-2011-0007803, filed on Jan. 26, 2011, in the Korean Intellectual Property Office, the entire disclosure of which is incorporated herein by reference for all purposes.

BACKGROUND

1. Field

The following description relates to controlling signal interference between networks in a personal area network.

2. Description of Related Art

In a typical wireless communication system, a signal generated in a transmission end may be transmitted to a reception end via a wireless channel. During transmission, the transmission signal may be transformed and/or distorted due to various types of other signal sources within the wireless channel, thereby causing a receive error in the reception end.

Signal sources causing the receive error in the wireless communication system may be generally classified into two categories: white noise and other signal interference. The white noise may correspond to a signal that has a mostly constant frequency component in a relatively wide frequency range and generally exists in the nature. The other signal interference may correspond to a signal that is transmitted from another wireless communication system to distort a received signal of the wireless communication system.

Based on the communication range and usage, for instance, a wireless communication network may be classified as a mobile cellular network, a wireless local area network, a personal area network, and/or the like. In particular, interest on the personal area network is increasing according to an increase in a communication between a terminal and a peripheral device and a communication between sensors around a human body and a mobile hub.

Wireless communications may employ a scheme of constraining a determined frequency to a specified protocol and thereby using the predetermined frequency, and a scheme of using a predetermined frequency band by sharing a variety of protocols when a predetermined criterion is satisfied. A personal area network generally employs the scheme of sharing the variety of protocols between the above two frequency use schemes.

In the case of a band using a frequency sharing scheme such as, for instance, an industrial scientific medical (ISM) band, signal interference between communication systems may be great due to signals from various communication systems, for example, heterogeneous protocols. In particular, since various communication protocols, for example, a wireless local area network (WLAN), Bluetooth, ZigBee, or the like, are present in a band of 2.4 GHz, an interference occurrence probability may be relatively high.

Signal interference may also occur between wireless apparatuses in the personal area network using the same protocol. In the personal area network using a low power communication due to a relatively small number of neighboring nodes, when wideband interference occurs due to a high power signal of wireless fidelity (WiFi) and/or the like, a number of frequency channels that may be used by the personal area network in order to avoid the interference may decrease. When a frequency band available to avoid interference decreases, a communication between a neighboring node and a network hub may not be smoothly performed.

SUMMARY

According to an aspect, an interference control apparatus may include: a cooperation determining unit configured to determine whether to perform a wireless cooperation with a neighboring mobile hub that manages a neighboring sensor node, based on a magnitude of an interference signal from the neighboring sensor node; a transmitter configured to transmit, to the neighboring mobile hub via a first communication link, first information received from a target sensor node; a receiver configured to receive the first information from the target sensor node via a second communication link, and to receive second information from the neighboring mobile hub via the first communication link; and a decoding unit configured to perform wireless cooperative multi-user decoding based on the first information and the second information.

The cooperation determining unit may include: an interference magnitude determining unit configured to determine whether the magnitude of the interference signal exceeds a predetermined threshold; and a homogenous protocol determining unit configured to determine whether an interference signal source uses the same type of a protocol as a protocol of the interference control apparatus when the magnitude of the interference signal exceeds the threshold, and when the interference signal sources is determined to use the same type of the protocol, the cooperation determining unit is configured to request the neighboring mobile hub for the wireless cooperation, and to determine whether to perform the wireless cooperation based on a state of the neighboring mobile hub.

The interference magnitude determining unit may be configured to determine whether the magnitude of the interference signal exceeds the predetermined threshold by intercepting, receiving, and/or analyzing a communication message between the neighboring mobile hub and an access point, and the homogeneous protocol determining unit may be configured to determine whether the interference signal source uses the same type of the protocol as the protocol of the interference control apparatus by intercepting, receiving, and/or analyzing data/acknowledgement (ACK) message communication between the neighboring mobile hub and the access point.

The cooperation determining unit may be configured to determine whether to perform the wireless cooperation by periodically measuring the magnitude of the interference signal from the neighboring sensor node.

When the wireless cooperation is determined to be performed, the transmitter may be configured to transmit a request signal of a wireless cooperative multipoint (WiCoMP) mode to the neighboring mobile hub, and the receiver may be configured to receive an acceptance signal of the WiCoMP mode from the neighboring mobile hub.

The transmitter may be configured to transmit, via the second communication link, a channel number of a channel for receiving the first information from the target sensor node.

The transmitter may be configured to transmit the first information to the neighboring mobile hub via an access point.

The transmitter may be configured to directly transmit the first information to the neighboring mobile hub.

The first information may include circumstance information of a first personal area network comprising the target sensor node, and the second information may include circumstance information of a second personal area network comprising the neighboring sensor node.

The first information may include channel information of the second communication link or data information sensed at the target sensor node.

The decoding unit may include configured to generate a signal in which interference of the neighboring sensor node is cancelled using a multi-user multiple input multiple output (MU-MIMO) reception processing scheme, based on the first information and the second information.

The apparatus may further include: a usage determining unit to determine whether to use the wireless cooperation by comparing a frequency efficiency and a data rate of the second communication link and the first communication link with a predetermined value prior to transmitting the first information to the neighboring mobile hub via the first communication link.

The apparatus may further include: an interference signal cancellation unit to cancel the interference signal using a spreading mode scheme or a duty cycle mode scheme with respect to an interference free area in a frame comprising the first information and the second information, wherein the transmitter is configured to transmit the first information via the first communication link with respect to an interference occurring area in the frame comprising the first information and the second information, and the receiver is configured to receive the second information via the first communication link with respect to the interference occurring area in the frame comprising the first information and the second information.

The apparatus may further include: a control unit configured to control a frequency reuse rate based on a relative distance from the target sensor node, wherein when the relative distance is greater than or equal to a predetermined value, the decoding unit is configured to perform the wireless cooperative multi-user decoding.

The first communication link may include a high spectral efficient (HSE) link; and the second communication link may include an ultra low power (ULP) link.

According to an aspect, an interference control apparatus may include: a receiver configured to receive a channel number from a mobile hub; a sensing unit configured to generate sensing information by sensing an area of a personal area network controlled by the mobile hub; and a transmitter configured to transmit the sensing information to the mobile hub.

According to an aspect, an interference control system may include: a first mobile hub configured to: determine whether to perform a wireless cooperation with a second mobile hub based on a magnitude of an interference signal from a second sensor node; receive first information from a first sensor node associated with the first mobile hub via a first communication link; receive second information from the second mobile hub via a second communication link; and cancel the interference signal based on the first information and the second information.

The first sensor node may be configured to receive a channel number for the first communication link, and to transmit the first information via the first communication link; the second mobile hub may be configured to receive the second information from the second sensor node via the same channel as the first communication link, and to transmit the second information to the first mobile hub via the second communication link; and the second sensor node may be configured to receive the same channel number as the first communication link, and to transmit the second information via the first communication link.

The first mobile hub may be configured to generate a signal in which interference of the second sensor node is cancelled using a multi-user multiple input multiple output (MU-MIMO) reception processing scheme, based on the first information and the second information.

The first mobile hub and the second mobile hub may be configured to detect a signal of the first sensor node and a signal of the second sensor node based on the first information and the second information using one or more receive antennas.

The first mobile hub may be configured to reuse a frequency used for the first communication link when a relative distance from the first sensor node is less than a predetermined value and to reuse a frequency different from the frequency used for the first communication link when the relative distance is greater than or equal to the predetermined value.

The first communication link may include an ultra low power (ULP) link; and the second communication link may include a high spectral efficient (HSE) link.

According to an aspect, an interference control method may include: determining whether to perform a wireless cooperation with a neighboring mobile hub that manages a neighboring sensor node, based on a magnitude of an interference signal from the neighboring sensor node; transmitting a channel number to a target sensor node when the wireless cooperation with the neighboring mobile hub is determined to be performed; receiving first information from the target sensor node via a first communication link; transmitting the first information to the neighboring mobile hub via a second communication link; receiving second information from the neighboring mobile hub via the second communication link; and performing wireless cooperative multi-user decoding based on the first information and the second information.

The determining may include: determining whether the magnitude of the interference signal exceeds a predetermined threshold; and determining whether an interference signal source uses the same type of a protocol as a protocol of an interference control apparatus when the magnitude of the interference signal exceeds the threshold, requesting the neighboring mobile hub for the wireless cooperation; and determining whether to perform the wireless cooperation based on a state of the neighboring mobile hub when the interference signal source is determined to use the same type of the protocol.

The method may further include: transmitting a request signal of a wireless cooperative multipoint (WiCoMP) mode to the neighboring mobile hub when the wireless cooperation is determined to be performed; and receiving an acceptance signal of the WiCoMP mode from the neighboring mobile hub.

Performing of the wireless cooperative multi-user decoding may include: generating a signal in which interference of the neighboring sensor node is cancelled using a multi-user multiple input multiple output (MU-MIMO) reception processing scheme, based on the first information and the second information.

The method may further include: determining whether to use the wireless cooperation by comparing a frequency efficiency and a data rate of the first communication link and the second communication link with a predetermined value prior to transmitting the first information to the neighboring mobile hub via the second communication link.

The method may further include: cancelling the interference signal using a spreading mode scheme or a duty cycle mode scheme with respect to an interference free area in a frame comprising the first information and the second information, wherein the transmitting of the first information comprises transmitting the first information via the second communication link with respect to an interference occurring area in the frame comprising the first information and the second information, and the receiving of the second information comprises receiving the second information via the second communication link with respect to the interference occurring area in the frame comprising the first information and the second information.

The method may further include: controlling a frequency reuse rate based on a relative distance from the target sensor node, wherein the performing of the wireless cooperative multi-user decoding comprises performing the wireless cooperative multi-user decoding when the relative distance is greater than or equal to a predetermined value.

The first communication link may include an ultra low power (ULP) link; and the second communication link may include a high spectral efficient (HSE) link.

According to an aspect, an interference control method may include: receiving a channel number from a mobile hub when the mobile hub performs a wireless cooperative multipoint (WiCoMP) mode operation; generating information by sensing a predetermined area of a personal area network controlled by the mobile hub; and transmitting the sensing information to the mobile hub.

According to an aspect, an interference control system method may include: receiving first information from a sensor node associated within a mobile hub; receiving second information from a neighboring mobile hub; and cancelling an interference signal from a neighboring sensor node associated with the neighboring mobile hub based on the first information and the second information.

Other features and aspects will be apparent from the following detailed description, the drawings, and the claims.

Figure 1:
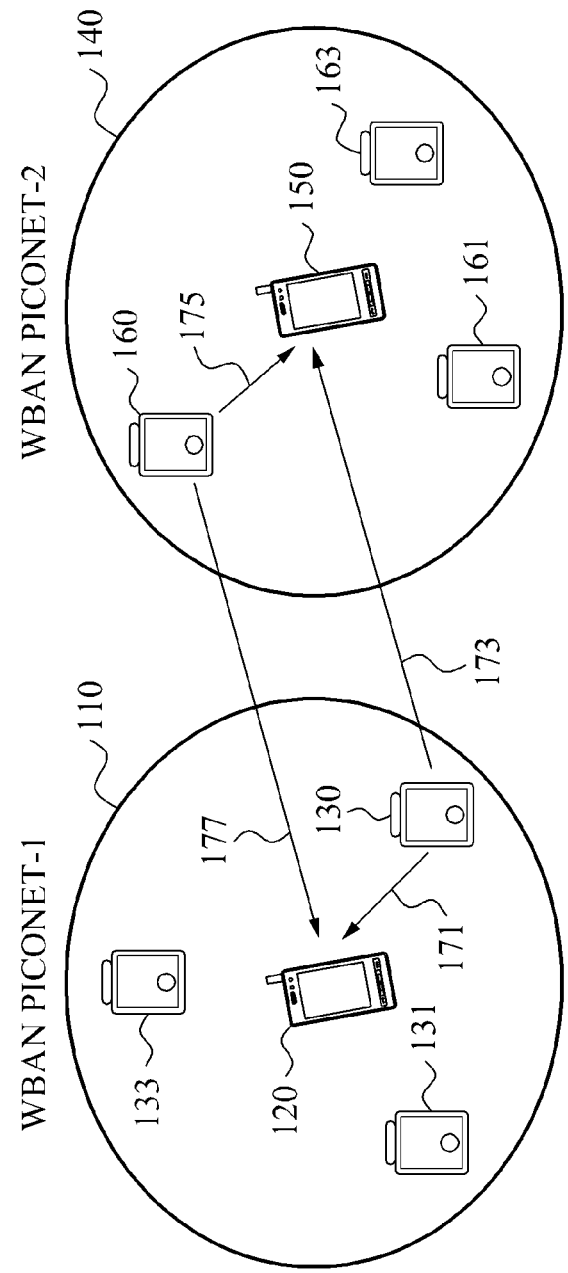
FIG. 1 is a diagram illustrating signal interference between personal area networks using the same protocol.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, description of well-known functions and constructions may be omitted for increased clarity and conciseness.

As generally known, an industrial scientific medical (ISM) band including a frequency band between about 2.4 GHz to 2.46 GHz may be used for communication of data between personal area networks. However, the ISM band corresponds to a band being used by existing communication schemes, such as, for example, a wireless local area network (WLAN) of a wireless fidelity (WiFi) scheme, Bluetooth, ZigBee, wireless highway addressable remote transducer (WirelessHART), and/or the like. Due to the co-existence of the ISM and these other schemes, a substantial smooth communication band in a predetermined personal area network may be decreases.

Adding of a band of about 2.36 GHz to 2.4 GHz is currently in consideration to be used as a frequency band for a medical use, for instance. When the number of sensor nodes using a corresponding cell increases (even though a medical device uses the band of 2.36 GHz to 2.4 GHz), technology for processing mutual interference between homogeneous schemes while effectively using frequency resources may be employed. For example, some existing schemes for minimizing mutual interference may include, for example, a scheme of using band spreading, a scheme of using duty cycling, a scheme of applying a different frequency channel for each channel, or the like.

The above schemes may additionally assign a new resource with respect to each of neighboring network apparatuses through code division, time division, frequency division, and/or the like and thus, may have some constraints when a limited resource is to be effectively used.

Thus, according to one or more embodiments described herein provide a method of significantly decreasing signal interference while minimally using a limited resource. For instance, a process that may remove or minimize an interference signal by verifying a characteristic of an interference signal source is described herein.

FIG. 1 illustrates signal interference between personal area networks using the same protocol. For example, as described below, a wireless body area network (WBAN) pico network may be included in a personal area network. Although, it will be appreciated that other types of personal area networks may also be possible. As shown in FIG. 1, two WBAN pico networks are present. A first mobile hub 120 may be configured to manage a first pico network 110 and a second mobile hub 150 may be configured to manage a second pico network 140. As shown, first and second mobile hubs 120 and 150 may include a mobile device, such as, for example, a cellular phone, smart-phone, computer (e.g., notebook, laptop, netbook, etc), personal digital assistance (PDA), or other mobile computing device.

In various implementations, sensor nodes 130, 131, and 133 included in the first pico network 110 may be configured to perform a low power communication signal 171 (for instance, with sensor node 130) within the first mobile hub 120. Similarly, sensor nodes 160, 161, and 163 included in the second pico network 140 may be configured to perform a low power communication signal 175 (for instance, with sensor 16) within the second mobile hub 150. The sensor nodes may be fixed or mobile, for instance.

A transmission signal 173 of the sensor node 130 that is included in the first pico network 110 may function as an interference signal in the second mobile hub 150 that receives the signal 175 from the sensor node 160. Similarly, a transmission signal 177 of the sensor node 160 included in the second pico network 140 may also function as an interference signal in the first mobile hub 120 that receives the signal 171 from the sensor node 130.

Interference between the first and second mobile hubs 120 and 150 and the sensor nodes 130 and 160 that perform low power communications 171 and 175 may be minimized as described herein.

Figure 2:
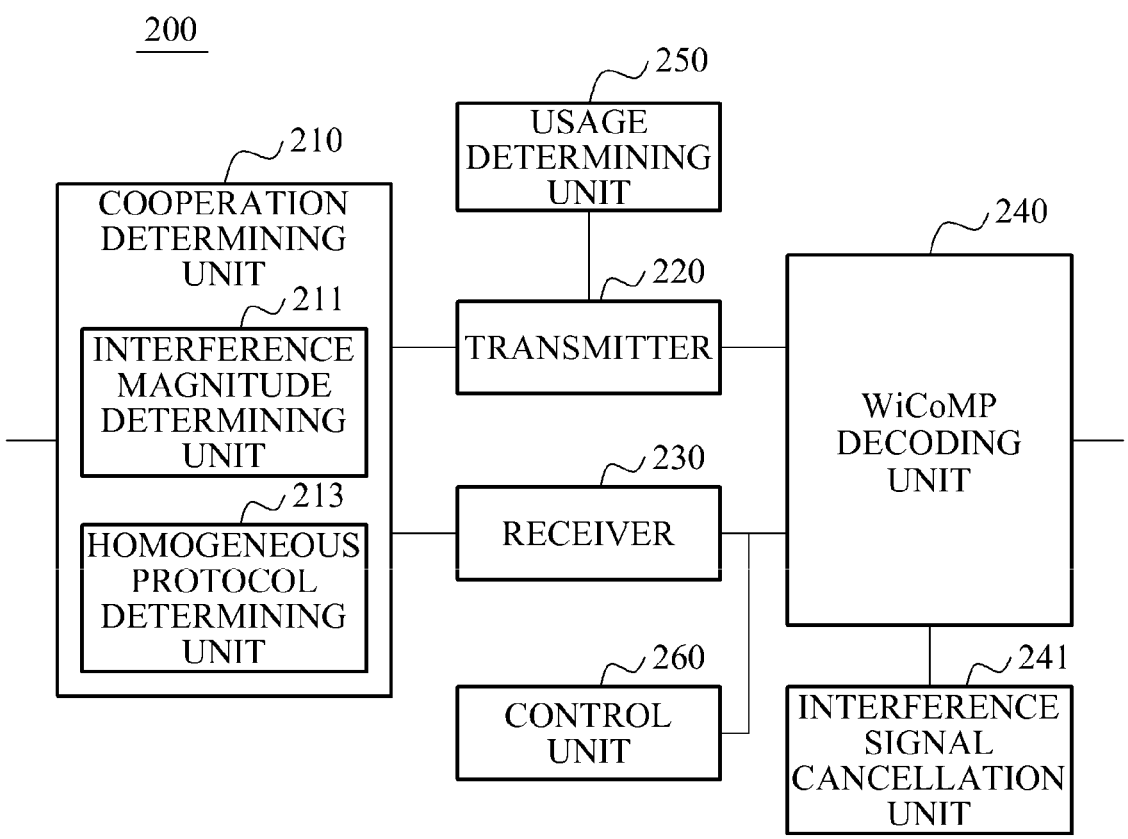
FIG. 2 is a diagram illustrating an interference control apparatus for simultaneously supporting a high power communication and a high spectral efficiency (HSE) communication.

FIG. 2 illustrates an interference control apparatus 200 for simultaneously supporting a high power communication and a high spectral efficiency (HSE) communication.

As shown, the interference control apparatus 200 may include a cooperation determining unit 210, a transmitter 220, a receiver 230, a wireless cooperative multipoint (WiCoMP) decoding unit 240, a usage determining unit 250, and a control unit 260.

The cooperation determining unit 210 may be configured to determine whether to perform a wireless cooperation with a neighboring mobile hub that manages a neighboring sensor node, based on a magnitude of an interference signal from the neighboring sensor node In some implementations, the cooperation determining unit 210 may be configured to measure a magnitude of an interference signal from a neighboring sensor node included in another personal area network. For example, when the magnitude of the interference signal is greater than a predetermined threshold, the cooperation determining unit 210 may request the neighboring mobile hub for the wireless cooperation. In addition (or alternatively), the cooperation determining unit 210 may determine whether to perform the wireless cooperation by receiving a wireless cooperation acceptance signal from the neighboring mobile hub.

As shown, the cooperation determining unit 210 may further include an interference magnitude determining unit 211 and a homogeneous protocol determining unit 213, is some implementations.

The interference magnitude determining unit 211 may be configured to determine whether the measured magnitude of the interference signal from the neighboring sensor node exceeds the predetermined threshold. For instance, the interference magnitude determining unit 211 may be configured to measure the magnitude of the interference signal from the neighboring sensor node periodically or at predetermined time intervals.

When the magnitude of the interference signals exceeds the predetermined threshold, the homogeneous protocol determining unit 213 may be configured to determine whether an interference signal source uses the same type of a protocol as a protocol of the interference control apparatus 200.

In addition, the cooperation determining unit 210 may be configured to determine whether the interference signal sources uses the same type of the protocol in order to perform a wireless cooperation through a mobile hub between personal area networks.

When the interference signal source is determined to use the same type of the protocol, the cooperation determining unit 210 may then request the neighboring mobile hub for wireless cooperation, and may determine whether to perform the wireless cooperation based on a state of the neighboring mobile hub. For example, the neighboring mobile hub may correspond to a mobile hub included in another personal area network managing a neighboring sensor node. And when the neighboring mobile hub accepts the wireless cooperation request, the cooperation determining unit 210 may be configured to determine that the wireless cooperation is to be performed.

The interference magnitude determining unit 211 may also be configured to determine whether the magnitude of the interference signal exceeds the predetermined threshold by overhearing a request to send (RTS)/clear to send (CTS) communication between the neighboring mobile hub and a high data rate (HDR) HSE access point (AP), which will be further described with reference to FIG. 10.

In various embodiments, the homogeneous protocol determining unit 213 may determine whether the interference signal source uses the same type of the protocol as the protocol of the interference control apparatus 200 by intercepting, receiving and/or analyzing (e.g., "overhearing") one or more data/acknowledgement (ACK) communication messages between the neighboring mobile hub and the HDR HSE AP, which will be further described with reference to FIG. 10. Thus, the cooperation determining unit 210 may determine whether to perform the wireless cooperation by periodically measuring the magnitude of the interference signal from the neighboring sensor node.

When wireless cooperation is determined to be performed, the transmitter 220 may transmit a request signal of a wireless cooperative multipoint (WiCoMP) mode to the neighboring mobile hub. The receiver 230 may receive an acceptance signal of the WiCoMP mode from the neighboring mobile hub.

When the wireless cooperation with the neighboring mobile hub is performed, the transmitter 220 may transmit a channel number to a target sensor node. For example, when the receiver 230 receives the acceptance signal of the WiCoMP mode from the neighboring mobile hub, the transmitter 220 may then transmit the channel number to the target sensor node.

For example, the target sensor node may correspond to a sensor node managed by the interference control apparatus 200 for simultaneously supporting the low power communication and the HSE communication.

The transmitter 220 may be configured to transmit, to the neighboring mobile hub first information received from the target sensor node. For instance, transmission may be made via an HDR HSE link.

The first information may include channel information of a low data rate (LDR) ultra low power (ULP) link and/or data information sensed at the target sensor node. And the channel information of the LDR ULP link may correspond to communication channel information performed between the target sensor node and the interference control apparatus 200.

In some instances, the transmitter 220 may transmit only channel information of the LDR ULP link to the neighboring mobile hub, for example, via the HDR HSE link. The transmitter 220 may transmit channel information of the LDR ULP link and the data information to the neighboring mobile hub via the HDR HSE link.

The LDR ULP link may correspond to an LDR ULP near-field communication scheme. For a WBAN, for example, it may use a bandwidth of 1 MHz that is an LDR mode, and may support a maximum data rate of 1 Mbps. In addition, an arrival distance within about 2 meters may be realized.

The HDR HSE link may correspond to an HDR HSE near-field communication scheme. In various embodiments, the HDR HSE near-field communication scheme may employ an IEEE 802.11g WiFi scheme. As generally know, a IEEE 802.11g WiFi scheme may use a bandwidth of 20 MHz in an ISM band of 2.4 GHZ, and can support a maximum data rate of 54 Mbps. In addition, compared to the LDR ULP near-field communication scheme, IEEE 802.11g WiFi scheme may use a relatively high power and thus, may have an arrival distance within about 30 meters.

The transmitter 220 may be configured to transmit the channel number to the target sensor node, for example, via the LDR ULP link. In some instances, the transmitter 220 may transmit first information to the neighboring mobile hub via an AP. And the transmitter 220 may transmit the first information via the AP such as a WiFi scheme.

The transmitter 220 may directly transmit the first information to the neighboring mobile hub. For example, the transmitter 220 may directly transmit the first information to the neighboring mobile hub using an ultra wideband (UWB) scheme, for instance.

The receiver 230 may be configured to receive the first information (via the LDR ULP link), and may receive second information of the neighboring sensor node (via the HDR HSE link).

The first information may include circumstance information of a first personal area network including the target sensor node. And the second information may include circumstance information of a second personal area network including the neighboring sensor node.

The WiCoMP decoding unit 240 may be configured to perform wireless cooperative multi-user decoding based on the first information and the second information.

For example, the WiCoMP decoding unit 240 may be configured to generate a signal in which interference of the neighboring sensor node is cancelled. This may be accomplished, for instance, using a multi-user multiple input multiple output (MU-MIMO) reception processing scheme, based on the first information and the second information. In some instances, the wireless cooperative multi-user decoding may indicate calculating of an interference component included in the first information using the second information, and generating of the signal in which the interference of the neighboring sensor node is cancelled based on the calculated interference component.

Prior to transmitting the first information to the neighboring mobile hub via the HDR HSE link, the usage determining unit 250 may determine whether to use the wireless cooperation by comparing a frequency efficiency and a data rate of the LDR ULP link and the HDR HSE link with a predetermined value. When the frequency efficiency and the data rate are less than the predetermined value, it may be more effective in some cases, to use another interference control method.

The interference control apparatus 200 may further include an interference signal cancellation unit 241, in some implementations. For example, the interference signal cancellation unit 241 may be configured to cancel the interference signal using a spreading mode scheme or a duty cycle mode scheme with respect to an interference free area in a frame constituting the first information and the second information. This will be further described with reference to FIG. 6, below.

The transmitter 220 may be configured to transmit the first information (via the HDR HSE link) with respect to an interference occurring area in the frame constituting the first information and the second information. In an analogous manner, the receiver 230 may receive the second information (via the HDR HSE link) with respect to the interference occurring area in the frame constituting the first information and the second information.

When the relative distance between the interference control apparatus 200 and the target sensor node is less than a predetermined value, the control unit 260 may control a frequency reuse rate. For example, the control unit 260 may change the frequency being currently used for a communication with the target sensor node based on the relative distance from the target sensor node. This will be further described with reference to FIG. 7.

And, when the relative distance is greater than or equal to the predetermined value, the WiCoMP decoding unit 240 may perform wireless cooperative multi-user decoding based on the first information and the second information.

The interference control apparatus 200 may receive second information through a HDR HSE near-field communication with a mobile hub of another personal area network and thereby minimize or cancel an interference signal affecting the communication with the target sensor node. For example, the interference control apparatus 200 may perform the LDR ULP communication with the target sensor node, and may perform the HDR HSE communication with the mobile hub of the other personal area network.

The interference control apparatus 200 may cancel an interference signal occurring in the LDR ULP communication channel, based on second information received through the HDR HSE communication.

When the HDR HSE communication is used, a frequency loss may be reduced to about $\frac{1}{20}$ compared to a case where a separate frequency is assigned. Accordingly, it is possible to effectively control interference even in an environment where a limited frequency resource is provided.

Figure 3:
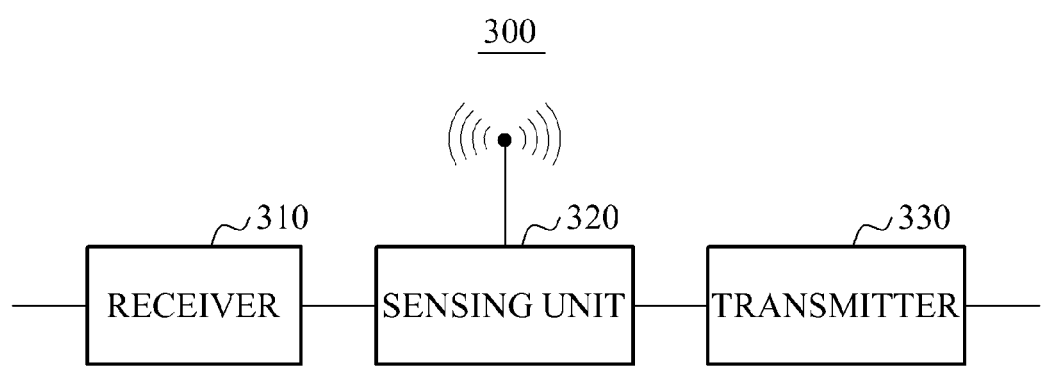
FIG. 3 is a diagram illustrating another interference control apparatus for simultaneously supporting a high power communication and an HSE communication.

FIG. 3 illustrates another interference control apparatus 300 for simultaneously supporting a low power communication and an HSE communication.

As shown, the interference control apparatus 300 may include a receiver 310, a sensing unit 320, and a transmitter 330.

The interference control apparatus 300 may correspond to a target sensor node or a neighboring sensor node, for instance.

When a mobile hub performs a WiCoMP mode, the receiver 310 may be configured to receive a channel number from the mobile hub, for instance, via an LDR ULP link. The receiver 310 may receive the channel number and prepare to provide sensing information to the mobile hub.

The sensing unit 320 may be configured to generate sensing information by sensing a predetermined area of a personal area network controlled by the mobile hub. The sensing information may include channel information of the LDR ULP link or data information sensed at a sensor node. The sensing information may include circumstance information of a personal area network that includes the sensor node.

The transmitter 330 may be configured to transmit the sensing information via the LDR ULP link. For example, the transmitter 330 may transmit the sensing information to the mobile hub via the LDR ULP link.

Figure 4:
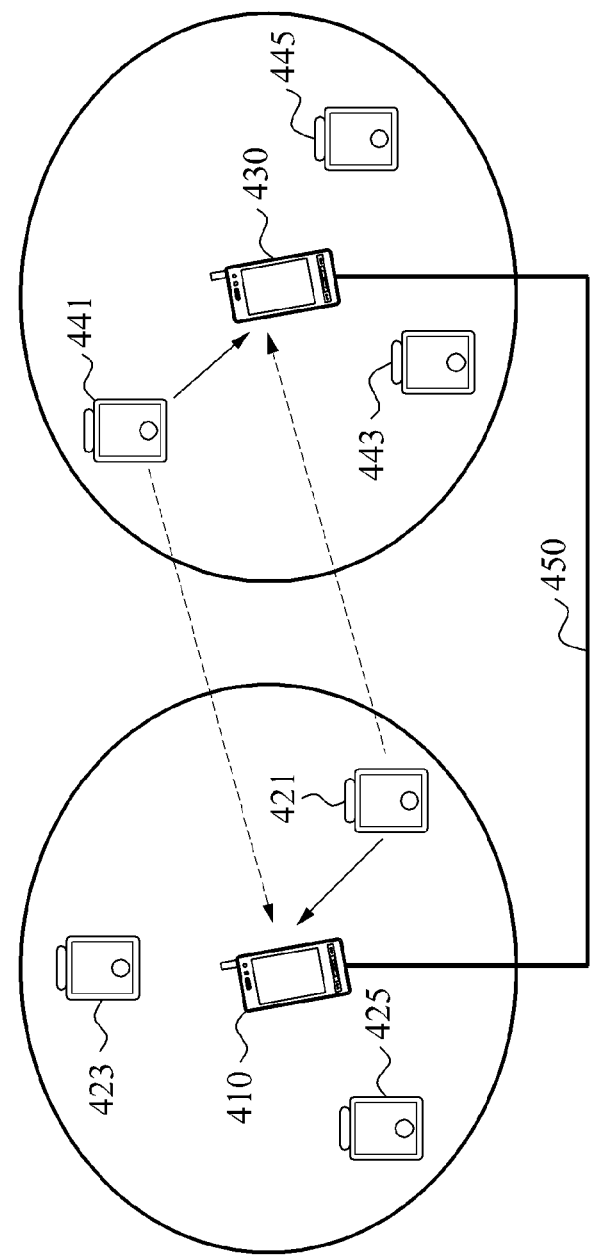
FIG. 4 is a diagram illustrating an interference control system for simultaneously supporting a high power communication and an HSE communication.

FIG. 4 illustrates an interference control system for simultaneously supporting a high power communication and an HSE communication.

As shown, the interference control system may include a first mobile hub 410, first sensor nodes 421, 423, and 425, a second mobile hub 430, and second sensor nodes 441, 443, and 445.

The first mobile hub 410 may be configured to determine whether to perform a wireless cooperation with the second mobile hub 430 based on a magnitude of an interference signal from the second sensor node 441 that may affect a communication with the first sensor node 421 using an LDR ULP link.

The first mobile hub 410 may receive first information from the first sensor node 421, for instance, via the LDR ULP link. In addition, the first mobile hub 410 may receive second information from the second mobile hub 430, for instance, via an HDR HSE link.

The first mobile hub 410 may be configured to cancel the interference signal of the second sensor node 441 based on the first information and the second information.

For instance, the first mobile hub 410 may generate a signal 450 in which interference of the second sensor node is cancelled using an MU-MIMO reception processing scheme, based on the first information and the second information.

When a relative distance from the first sensor node 421 is less than a predetermined value, the first mobile hub 410 may reuse the same frequency used for the LDR ULP link.

Conversely, when the relative distance is greater than or equal to the predetermined value, the first mobile hub 410 may use a frequency different from the frequency used for the LDR ULP link.

When the relative distance is greater than or equal to the predetermined value, the probability that the first sensor node 421 may be interfered with the second sensor nodes 441, 443, and 445 may increase. Thus, the first mobile hub 410 may assign, to the first sensor node 421, a frequency different from an existing frequency.

Each of the first sensor nodes 421, 423, and 425 may receive, from the first mobile hub, a channel number with respect to the LDR ULP link, and may transmit the first information via the LDR ULP link.

The second mobile hub 430 may receive second information from the second sensor node 441 via the same channel as the LDR ULP link between the first mobile hub 410 and the first sensor node 421. The second mobile hub 430 may transmit the second information to the first mobile hub 410 via the HDR HSE link.

Each of the second sensor nodes 441, 443, and 445 may receive a channel number from the second mobile hub 430 via the same link as the LDR ULP link between the first mobile hub 410 and the first sensor node 421, and may transmit the second information via the LDR ULP link.

In some embodiments, the aforementioned process may be used to implement a process of receiving, by the first mobile hub 410, second information from the second mobile 430 through the HDR HSE communication, and of cancelling an interference signal affecting the LDR ULP communication between the first mobile hub 410 and the first sensor node 421 based on the second information. In the aforementioned manner, the second mobile hub 430 may cancel an interference signal of the first sensor node 421 affecting the LDR ULP communication between the second mobile hub 430 and the second sensor node 441, based on the first information.

A relative frequency cost used for the wireless communication between the first mobile hub 410 and the second mobile hub 430 may be calculated using a ratio of a communication efficiency between the LDR ULP communication and the HDR HSE communication. For example, it may be assumed that the LDR ULP communication may transmit a signal of 50 Kbps (such as a medical signal) using a bandwidth of 1 MHz, and the HDR HSE communication may transmit a (medical) signal of 40 Mbps using a bandwidth of 20 MHz. The frequency efficiency of the LDR ULP communication may correspond to 0.05 bps/Hz as 50 Kbps/1 MHz, and the frequency efficiency of the HDR HSE communication may correspond to 2 bps/Hz as 40 Mbps/20 MHz, for instance. Since information needs to be transmitted and be received between the first mobile hub 410 and the second mobile hub 430, a relative frequency cost may be calculated as: (2×0.05)/2=0.05.

Accordingly, in a case of the LDR ULP communication using the bandwidth of 1 MHz, when an existing frequency resource division scheme uses a frequency of 2 MHz, an interference control apparatus for simultaneously supporting a low power communication and an HSE communication according to an embodiment may use a frequency of 1.05 MHz. For example, a frequency used for interference control may be reduced to about 1/20. Accordingly, information may be transmitted and be received between the first mobile hub 410 and the second mobile hub 430 without substantially causing a frequency loss.

In addition, since processing may be performed quickly by 40 Mbps/50 Kbps=800 folds using the HDR HSE communication, for example, a substantial delay time resulting from the wireless cooperation may not occur.

The first mobile hub 410 and the second mobile hub 430 may be configured to detect a signal of the first sensor node 421 and a signal of the second sensor node 441 based on the first information and the second information, for example, in an analogous way as a single virtual mobile hub performs reception using multiple receive antennas.

The interference control system for simultaneously supporting the low power communication and the HSE communication may perform the same (or similar) functionality as a single virtual mobile hub having a plurality of receive antennas by enabling the first mobile hub 410 and the second mobile hub 430 to share, using the HDR HSE communication, information received via the LDR ULP communication, for instance. The information to be shared may include information received from the first sensor node 421 and the second sensor node 441, information used to verify a channel state of the LDR ULP link such as a pilot received signal, and/or the like.

When K sensor nodes are present in different K personal area networks, a signal $y_k$ received each of K mobile hubs may be expressed by Equation 1.

$$y_k = h_k x_k + \sum_{j \neq k} h_j x_j + n_k, k = 1, 2, \ldots K \quad \text{[Equation 1]}$$

In Equation 1, $x_k$ corresponds to a signal received at a $K^{th}$ sensor node, $x_j$ corresponds to an interference signal affecting the $K^{th}$ sensor node, $n_k$ corresponds to noise, and each of $h_k$ and $h_j$ corresponds to a related variable. Each of K mobile hubs may calculate $h_k$ and $h_j$ by sharing information with another mobile hub through an HDR HSE communication.

A signal received at each of K mobile hubs may be expressed by a signal $y_1$ received at a single mobile hub as shown in Equation 2.

$$y_1 = [y_1, y_2, \ldots, y_K]^T \quad \text{[Equation 2]}$$

Equation 2 may be expressed in the same form as a signal string received at a single terminal via multiple antennas. Accordingly, the interference control system may perform the same (or similar) operation as the single virtual mobile hub by detecting a received signal using the one or more receive antennas.

Figure 5:
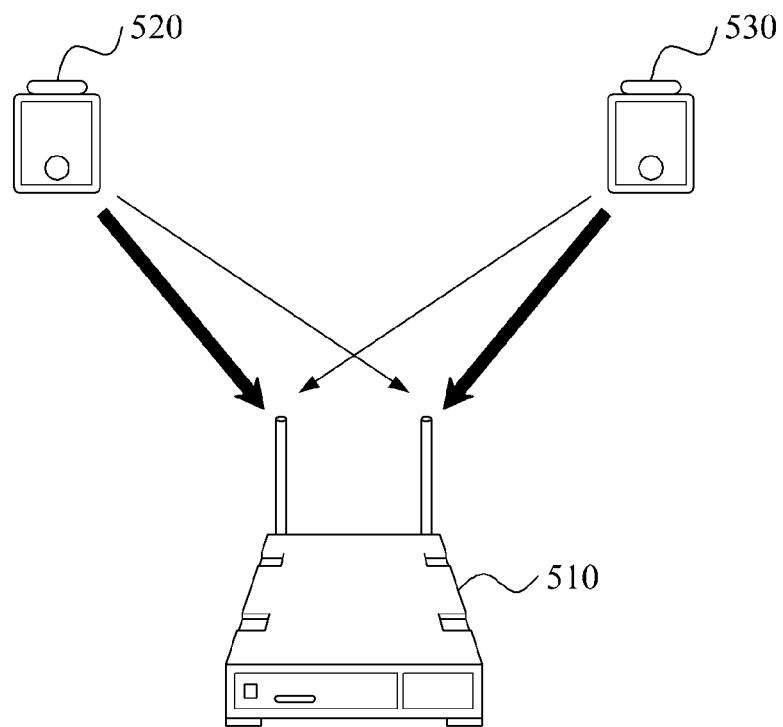
FIG. 5 is a diagram illustrating a virtual mobile hub.

FIG. 5 illustrates a virtual mobile hub.

As shown, a terminal 510 including two receive antennas may receive a signal from two sensor nodes 520 and 530, and may cancel an interference signal occurring in each of the sensor nodes 520 and 530. For example, the terminal 510 may correspond to two mobile hubs that share information via an HDR HSE communication to perform a wireless cooperation.

According to an embodiment, an interference control system for simultaneously supporting a low power communication and an HSE communication may be switched to an MU-MIMO communication environment like a single virtual hub detects a received signal via multiple receive antennas using at least two mobile hubs that perform the wireless cooperation.

Figure 6A:
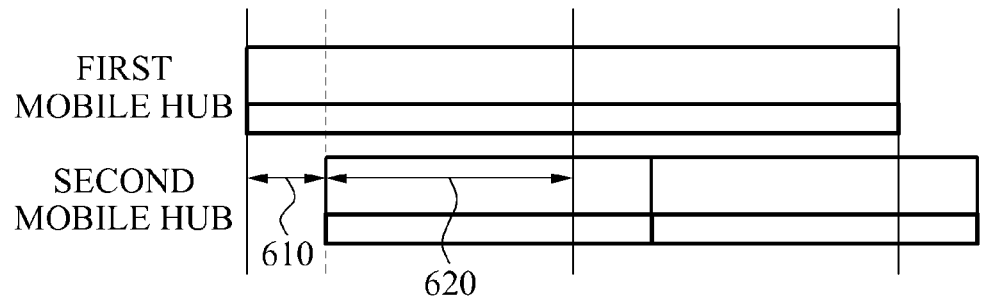
FIGS. 6A through 6C are diagrams illustrating an interference control method for simultaneously supporting a low power communication and an HSE communication.
Figure 6B:
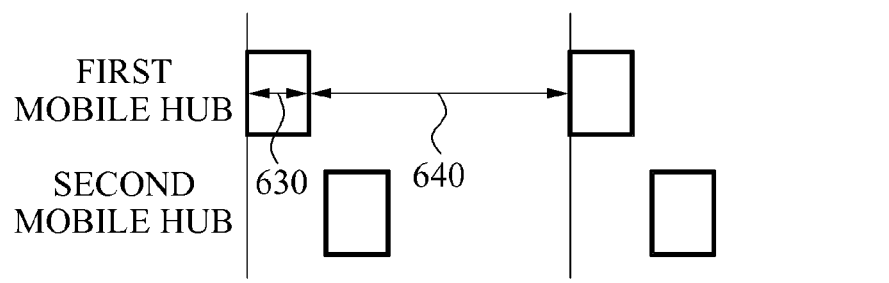
Figure 6C:
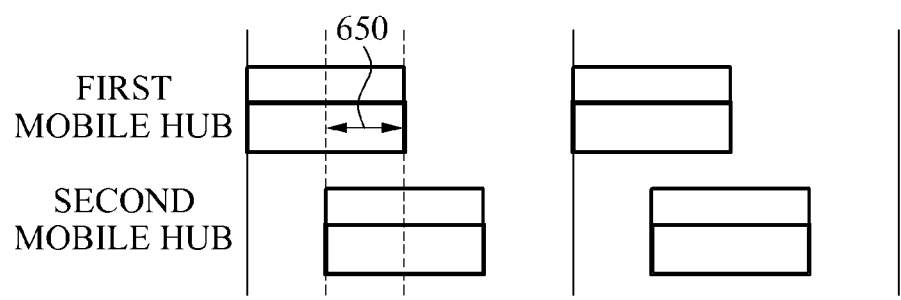

FIGS. 6A through 6C illustrate an interference control method for simultaneously supporting a low power communication and an HSE communication. FIG. 6A illustrates an example of using a spreading mode and a WiCoMP mode. FIG. 6B illustrates an example of using a duty cycle mode and the WiCoMP mode. FIG. 6C illustrates an example of using the spreading mode, the duty cycle mode, and the WiCoMP mode.

Referring to FIG. 6A, an interference control apparatus for simultaneously supporting the low power communication and the HSE communication may cancel interference by performing the WiCoMP mode in an area 620. Interference can occur between a first mobile hub and a second mobile hub. In an interference free area 610, interference may be generated. For instance, a spreading mode may be performed to generate the interference. There may be no further need to consume power by performing an HDR HSE communication between the first mobile hub and the second mobile hub in the interference free area 610 in some instances.

Referring to FIG. 6B, an area 630 where a first mobile hub receives a signal may be different from an area where the second mobile hub receives a signal. Accordingly, the interference control apparatus may avoid the interference using the duty cycle mode. And since interference does not occur in an area 640 where the first mobile hub does not receive a signal, the interference control apparatus may not perform the WiCoMP mode.

Referring to FIG. 6C, the interference control apparatus may cancel interference by performing the WiCoMP mode in an area 650 where interference occurs between the first mobile hub and the second mobile hub. In a remaining area excluding the area 650, interference may occur. This may be achieved, for example, by performing a spreading mode or a duty cycle mode.

Figure 7A:
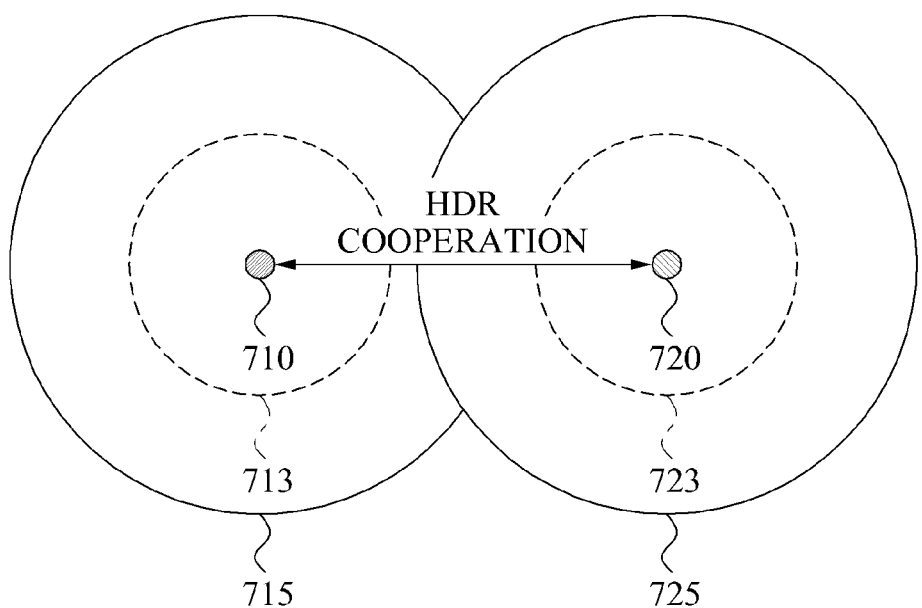
FIGS. 7A and 7B are diagrams illustrating an example of an interference control method using a frequency reuse rate based on a position of a sensor node in a personal area network.
Figure 7B:
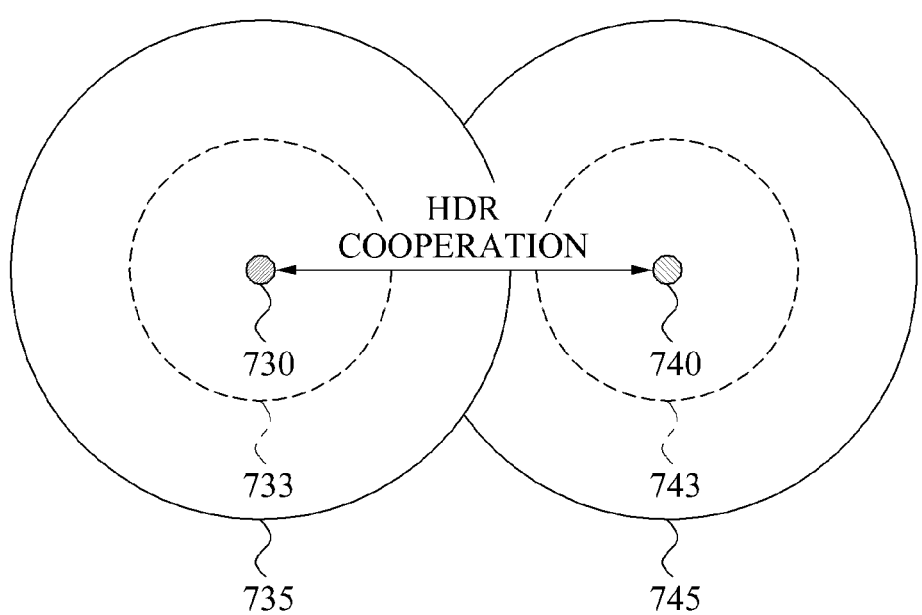

FIGS. 7A and 7B illustrate an example to describe an interference control method using a frequency reuse rate based on a position of a sensor node in a personal area network.

FIG. 7A illustrates an example of using a different frequency for interference cancellation based on a relative distance between a mobile hub and a sensor node. FIG. 7B illustrates an example of performing a WiCoMP mode based on a relative distance between the mobile hub and the sensor node.

Referring to FIG. 7A, a mobile hub 710 and a mobile hub 720 may exchange information associated with a corresponding position through an HDR HSE communication. When the sensor node is positioned within an area 713, an interference occurrence probability from a personal area network 725 managed by the mobile hub 720 may decrease and thus, the mobile hub 710 may reuse an existing frequency.

When the sensor node is positioned outside the area 713 within a personal area network 715, the interference occurrence probability from the personal area network 725 managed by the mobile hub 720 may increase. Thus, in these instances, the mobile hub 710 may use a frequency different from the existing frequency in order to avoid the interference.

Depending on whether the sensor node is positioned within or outside an area 723, the mobile hub 720 may determine whether to reuse a frequency.

For example, referring to FIG. 7B, a mobile hub 730 and a mobile hub 740 may exchange information of a corresponding position through an HDR HSE communication. When the sensor node is positioned within an area 733, an interference occurrence probability from a personal area network 745 managed by the mobile hub 740 may decrease and thus, the mobile hub 730 may reuse an existing frequency.

On the other hand, when the sensor node is positioned outside the area 733 within a personal area network 735, the interference occurrence probability from the personal area network 745 managed by the mobile hub 740 may increase and thus, the mobile hub 730 may perform a WiCoMP mode. Accordingly, the mobile hub 730 may control interference by receiving information associated with an interference signal from the mobile hub 740 through the HDR HSE communication.

Depending on whether the sensor node is positioned within or outside an area 743 within the personal area network 745, the mobile hub 740 may determine whether to perform the WiCoMP mode.

Figure 8:
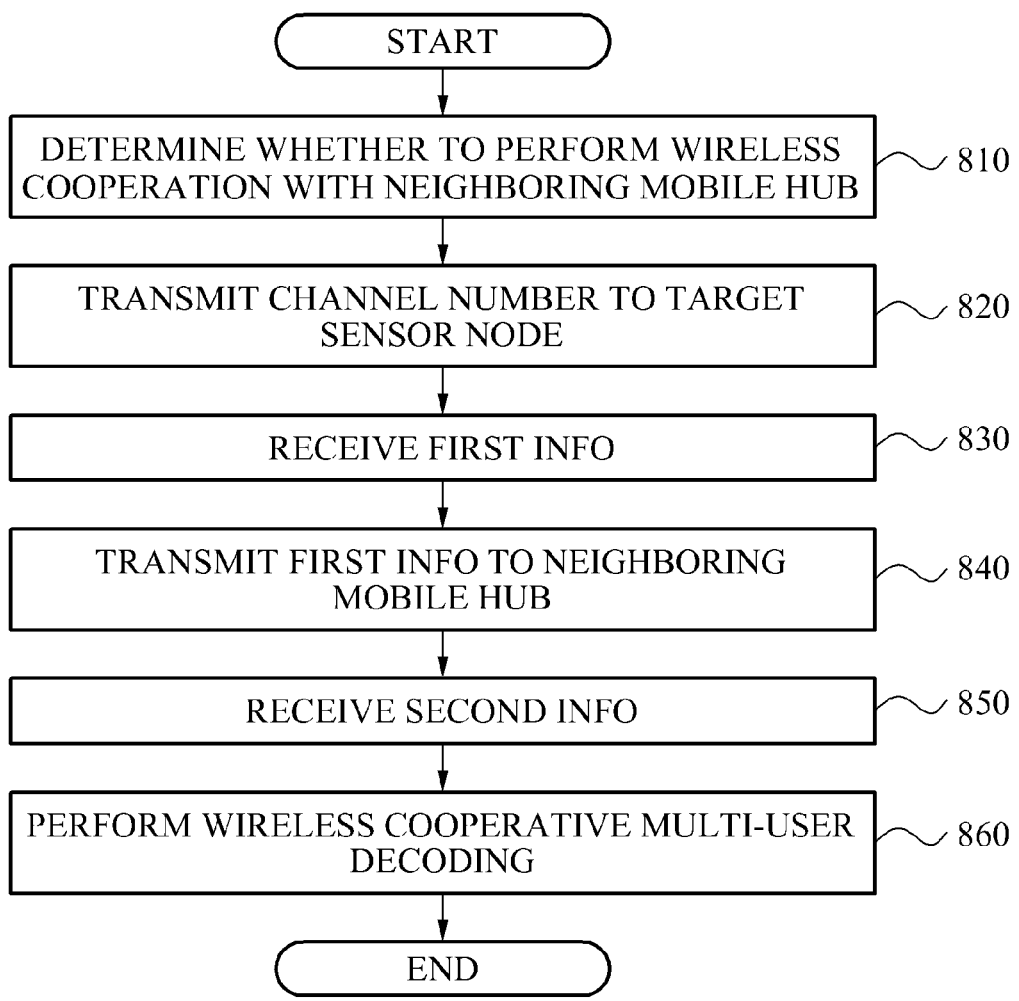
FIG. 8 is a flowchart illustrating an interference control method for simultaneously supporting a low power communication and an HSE communication.

FIG. 8 illustrates an interference control method for simultaneously supporting a low power communication and an HSE communication.

In operation 810, an interference control apparatus for simultaneously supporting the low power communication and the HSE communication may determine whether to perform a wireless cooperation with a neighboring mobile hub managing a neighboring sensor node, based on a magnitude of an interference signal from the neighboring sensor node.

For example, the interference control apparatus may determine whether the magnitude of the interference signal exceeds a predetermined threshold. When the magnitude of the interference signal exceeds the predetermined threshold, the interference control apparatus may determine whether an interference signal source uses the same type of a protocol as a protocol of the interference control apparatus.

In various embodiments, when the interference signal source may be determined to use the same type of the protocol, the interference control apparatus may request the neighboring mobile hub for the wireless cooperation, and may determine whether to perform the wireless cooperation based on a state of the neighboring mobile hub.

When the wireless cooperation is determined to be performed, the interference control apparatus may transmit a request signal of a WiCoMP mode to the neighboring mobile hub, and may receive an acceptance signal of the WiCoMP mode from the neighboring mobile hub.

In operation 820, when wireless cooperation with the neighboring mobile terminal is determined to be performed, the interference control apparatus may transmit a channel number to a target sensor node.

In operation 830, the interference control apparatus may receive first information of the target sensor node, for example, via an LDR ULP link.

Prior to transmitting the first information to the neighboring mobile hub via an HDR HSE link, the interference control apparatus may determine whether to use the wireless cooperation by comparing a frequency efficiency and a data rate of the LDR ULP link and the HDR HSE link with a predetermined value.

In operation 840, the interference control apparatus may transmit the first information to the neighboring mobile hub (via the HDR HSE link).

In operation 850, the interference control apparatus may receive second information of the neighboring sensor node (via the HDR HSE link).

In operation 860, the interference control apparatus may perform wireless cooperative multi-user decoding based on the first information and the second information.

The interference control apparatus may generate a signal in which interference of the neighboring sensor node is cancelled using an MU-MIMO reception processing scheme, based on the first information and the second information.

The interference control apparatus may cancel the interference signal using a spreading mode scheme or a duty cycle mode scheme with respect to an interference free area in a frame constituting the first information and the second information.

For example, the interference control apparatus may transmit the first information via the HDR HSE link with respect to an interference occurring area in the frame constituting the first information and the second information.

In addition, the interference control apparatus may receive the second information via the HDR HSE link with respect to the interference occurring area in the frame constituting the first information and the second information.

When a relative distance from a target sensor node is less than a predetermined value, the interference control apparatus may control a frequency reuse rate. Conversely, when the relative distance is greater than or equal to the predetermined value, the interference control apparatus may perform wireless cooperative multi-user decoding.

Figure 9:
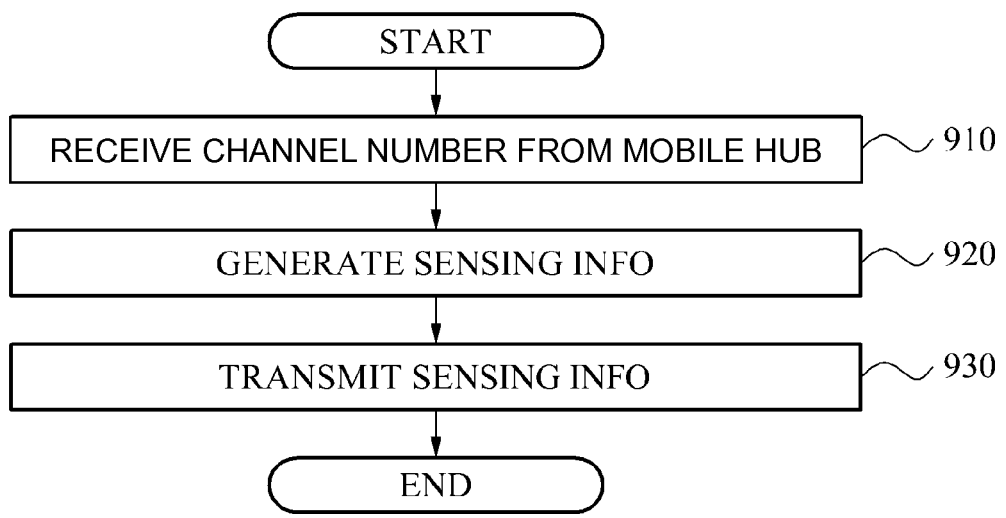
FIG. 9 is a flowchart illustrating another interference control method for simultaneously supporting a low power communication and an HSE communication.

FIG. 9 illustrates another interference control method for simultaneously supporting a low power communication and an HSE communication.

In operation 910, when a mobile hub performs a WiCoMP mode, an interference control apparatus for simultaneously supporting the low power communication and the HSE communication may receive a channel number from the mobile hub, for example, via an LDR ULP link.

In operation 920, the interference control apparatus may generate sensing information by sensing a predetermined area of a personal area network controlled by the mobile hub.

In operation 930, the interference control apparatus may transmit the sensing information (via the LDR ULP link).

Figure 10:
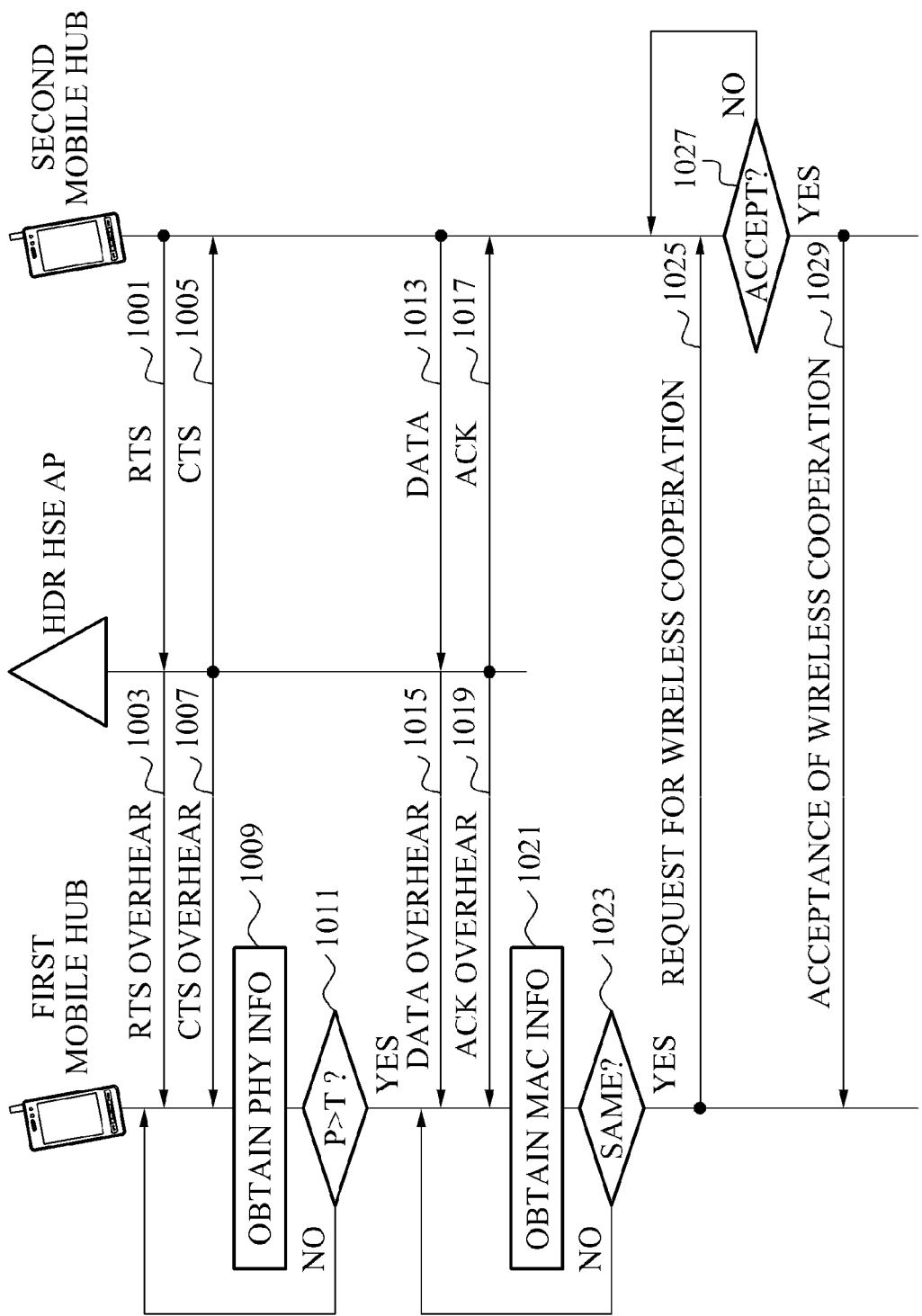
FIG. 10 is a diagram illustrating a wireless cooperation initialization procedure in an interference control method for simultaneously supporting a low power communication and an HSE communication.

FIG. 10 illustrates a wireless cooperation initialization procedure in an interference control method for simultaneously supporting a low power communication and an HSE communication.

A first mobile hub may perform an initialization operation prior to requesting a wireless cooperation. An RTS signal and a CTS signal may be used to solve an issue of a hidden mobile hub, for instance. Prior to transmitting data, a mobile hub may verify, using the RTS signal and the CTS signal, whether an HDR HSE AP is being used by another hidden mobile hub.

At operation 1001, a second mobile hub may transmit an RTS signal to the HDR HSE AP.

At operation 1003, the first mobile hub may overhear the RTS signal transmitted from the second mobile hub.

At operation 1005, the HDR HSE AP may transmit a CTS signal to the second mobile hub.

At operation 1007, the first mobile hub may intercept, receive, and/or analyze (e.g., "overhear") the CTS signal transmitted from the HDR HSE AP.

At operation 1009, the first mobile hub may obtain physical layer (PHY) information of the second mobile hub based on the overheard RTS signal and CTS signal.

At operation 1011, the first mobile hub may measure a magnitude P of an interference signal from the second mobile hub and may determine whether the magnitude P of the interference signal exceeds a predetermined threshold T. When the magnitude P of the interference signal is less than the predetermined threshold T, the first mobile hub may overhear the RTS signal and the CTS signal periodically or at predetermined time intervals.

At operation 1013, the second mobile hub may transmit data to the HDR HSE AP.

At operation 1015, the first mobile hub may overhear the data transmitted from the second mobile hub.

At operation 1017, the HDR HSE AP may transmit an acknowledgement (ACK) signal to the second mobile hub.

At operation 1019, the first mobile hub may overhear the ACK signal transmitted from the HDR HSE AP.

At operation 1021, the first mobile hub may obtain media access control (MAC) information of the second mobile hub based on the overheard data and ACK signal.

At operation 1023, the first mobile hub may determine whether the second mobile hub uses the same type of a protocol as a protocol of the first mobile hub based on the MAC information of the second mobile hub. When the second mobile hub is determined to not use the same type of the Protocol, the first mobile hub may obtain data and an ACK signal from another mobile hub.

At operation 1025, when the second mobile hub is determined to use the same type of the protocol, the first mobile hub may request the second mobile hub for the wireless cooperation.

At operation 1027, the second mobile hub may determine whether to accept the wireless cooperation.

At operation 1029, when the second mobile hub accepts the wireless cooperation, the second mobile hub may transmit an acceptance signal to the first mobile hub.

When the wireless cooperation is determined to be performed through the aforementioned procedure, the wireless cooperation may be performed between the first mobile hub and the second mobile hub.

Figure 11:
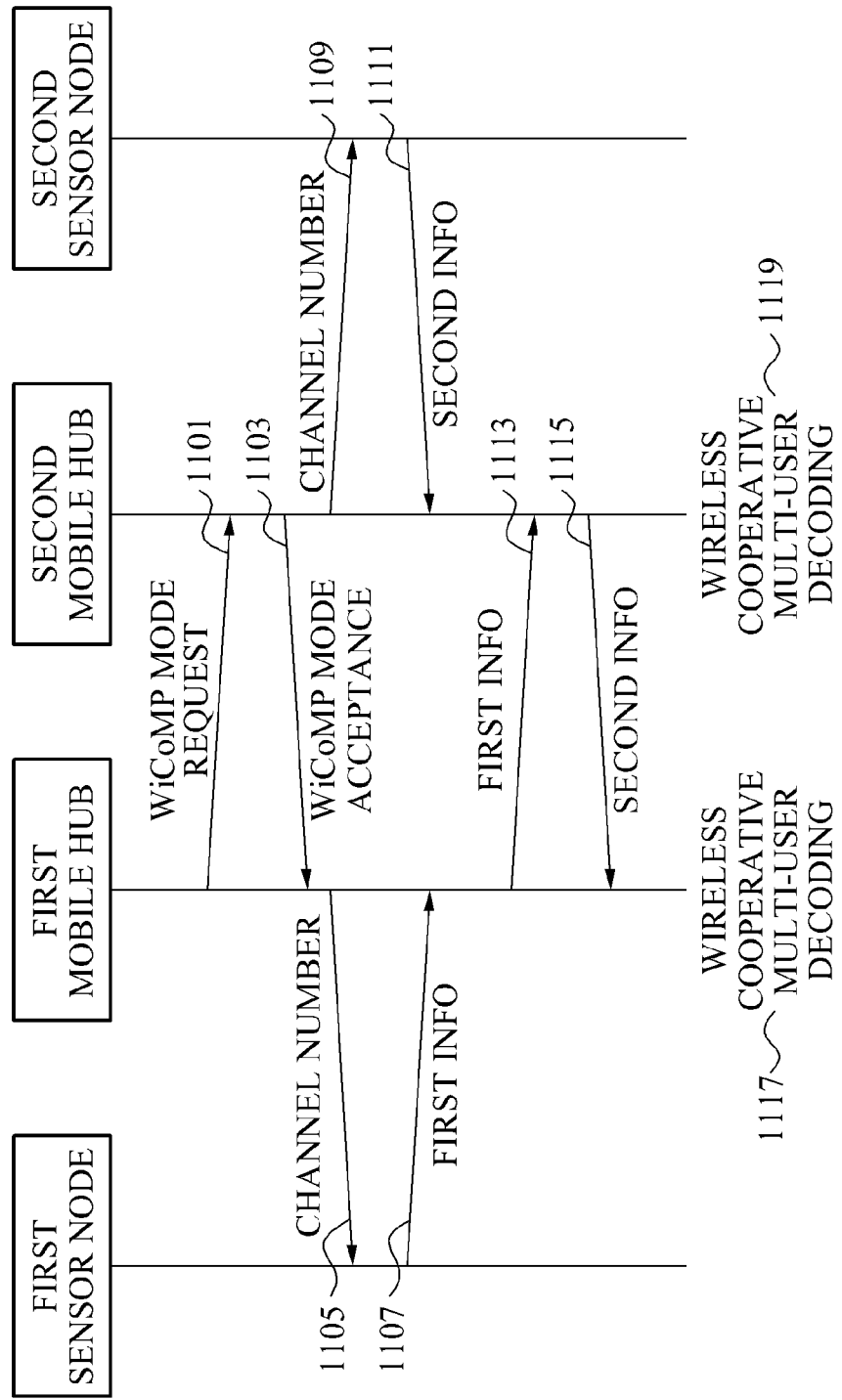
FIG. 11 is a diagram illustrating an interference control method for simultaneously supporting a low power communication and an HSE communication.

FIG. 11 illustrates an interference control method for simultaneously supporting a low power communication and an HSE communication.

At operation 1101, a first mobile hub may transmit a WiCoMP mode request signal to a second mobile hub.

At operation 1103, when the second mobile hub is to cooperate with the WiCoMP mode request, the second mobile hub may transmit an acceptance signal.

At operation 1105, the first mobile hub may transmit a channel number to a first sensor node. The first mobile hub may perform an LDR ULP communication with the first sensor node.

At operation 1107, the first sensor node may transmit first information to the first mobile hub through the LDR ULP communication. The first information may include data sensed at the first sensor node or state information associated with an LDR ULP communication channel, for instance.

At operation 1109, the second mobile hub may transmit, to a second sensor node, the same channel number as the channel number transmitted from the first mobile hub to the first sensor node. The second mobile hub may perform the LDR ULP communication with the second sensor node.

At operation 1111, the second sensor may transmit second information to the second mobile hub through the LDR ULP communication. The second information may include data sensed at the second sensor node or state information associated with the LDR ULP communication channel.

At operation 1113, the first mobile hub may transfer the first information to the second mobile hub through an HDR HSE communication.

At operation 1115, the second mobile hub may transfer the second information to the first mobile hub through the HDR HSE communication.

At operation 1117, the first mobile hub may cancel an interference signal occurring in the first sensor node by performing wireless cooperative multi-user decoding based on the first information and the second information.

At operation 1119, the second mobile hub may cancel an interference signal occurring in the second sensor node by performing wireless cooperative multi-user decoding based on the first information and the second information.

The various embodiments described herein may be applicable to a near-field low power personal area network communication method, for example, a WBAN and/or the like using a portable terminal. In one embodiment, the WBAN may be employed in a health care field of transmitting a signal sensed from a human body to a base station and the like via a portable terminal to thereby communicate with a hospital. Accordingly, the embodiments may also be applicable to the health care field using human body related information and using a relatively high reliability.

According to various embodiments, an interference control apparatus for simultaneously supporting a low power communication and an HSE communication may enhance a communication performance between a sensor node and a mobile hub by controlling inter-signal interference of a low data rate (LDR) ULP communication channel using a high data rate (HDR) HSE communication channel. While reference is made to the ULP communication and HSE communication links, described herein, it will be appreciated that other communication links may also be used.

Even though an existing interference avoidance scheme employs an additional wireless resource in proportion to a number of interfering terminals in order to decrease interference occurring between a plurality of nodes, the embodiments describe herein may significantly decrease a use of additional resources by controlling inter-signal interference of a ULP communication channel using an HSE communication channel.

In addition, it may be possible to significantly decrease a loss of a frequency used for controlling interference by controlling the inter-signal interference of the ULP communication channel using the HSE communication channel. Since cooperation between a plurality of mobile hubs through an HSE communication can be used, it may be possible to detect a signal by minimizing interference using a multi-antenna receive scheme, which is the same (or similar) as a single virtual mobile hub receives a signal using one or more receive antennas.

The processes, functions, methods and/or software described above may be recorded, stored, or fixed in one or more non-transitory computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and/or the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa. In addition, a non-transitory computer-readable storage medium may be distributed among computer systems connected through a network and non-transitory computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An interference control apparatus comprising:
 a cooperation determining unit configured to determine whether to perform a wireless cooperation with a neighboring mobile hub that manages a neighboring sensor node, based on a magnitude of an interference signal from the neighboring sensor node;
 a transmitter configured to transmit, to the neighboring mobile hub via a first communication link, first information received from a target sensor node;
 a receiver configured to receive the first information from the target sensor node via a second communication link, and to receive second information from the neighboring mobile hub via the first communication link; and
 a decoding unit configured to perform wireless cooperative multi-user decoding based on the first information and the second information.

2. The apparatus of claim 1, wherein the cooperation determining unit comprises:
 an interference magnitude determining unit configured to determine whether the magnitude of the interference signal exceeds a predetermined threshold; and
 a homogenous protocol determining unit configured to determine whether an interference signal source uses the same type of a protocol as a protocol of the interference control apparatus when the magnitude of the interference signal exceeds the threshold, and
 when the interference signal sources is determined to use the same type of the protocol, the cooperation determining unit is configured to request the neighboring mobile hub for the wireless cooperation, and to determine whether to perform the wireless cooperation based on a state of the neighboring mobile hub.

3. The apparatus of claim 2, wherein:
the interference magnitude determining unit is configured to determine whether the magnitude of the interference signal exceeds the predetermined threshold by intercepting, receiving, and/or analyzing a communication message between the neighboring mobile hub and an access point, and
the homogeneous protocol determining unit is configured to determine whether the interference signal source uses the same type of the protocol as the protocol of the interference control apparatus by intercepting, receiving, and/or analyzing data/acknowledgement (ACK) message communication between the neighboring mobile hub and the access point.

4. The apparatus of claim 1, wherein the cooperation determining unit is configured to determine whether to perform the wireless cooperation by periodically measuring the magnitude of the interference signal from the neighboring sensor node.

5. The apparatus of claim 1, wherein:
when the wireless cooperation is determined to be performed, the transmitter is configured to transmit a request signal of a wireless cooperative multipoint (WiCoMP) mode to the neighboring mobile hub, and
the receiver is configured to receive an acceptance signal of the WiCoMP mode from the neighboring mobile hub.

6. The apparatus of claim 1, wherein the transmitter is configured to transmit, via the second communication link, a channel number of a channel for receiving the first information from the target sensor node.

7. The apparatus of claim 1, wherein the transmitter is configured to transmit the first information to the neighboring mobile hub via an access point.

8. The apparatus of claim 1, wherein the transmitter is configured to directly transmit the first information to the neighboring mobile hub.

9. The apparatus of claim 1, wherein the first information comprises circumstance information of a first personal area network comprising the target sensor node, and the second information comprises circumstance information of a second personal area network comprising the neighboring sensor node.

10. The apparatus of claim 1, wherein the first information comprises channel information of the second communication link or data information sensed at the target sensor node.

11. The apparatus of claim 1, wherein the decoding unit is configured to generate a signal in which interference of the neighboring sensor node is cancelled using a multi-user multiple input multiple output (MU-MIMO) reception processing scheme, based on the first information and the second information.

12. The apparatus of claim 1, further comprising:
a usage determining unit to determine whether to use the wireless cooperation by comparing a frequency efficiency and a data rate of the second communication link and the first communication link with a predetermined value prior to transmitting the first information to the neighboring mobile hub via the first communication link.

13. The apparatus of claim 1, further comprising:
an interference signal cancellation unit to cancel the interference signal using a spreading mode scheme or a duty cycle mode scheme with respect to an interference free area in a frame comprising the first information and the second information, wherein the transmitter is configured to transmit the first information via the first communication link with respect to an interference occurring area in the frame comprising the first information and the second information, and
the receiver is configured to receive the second information via the first communication link with respect to the interference occurring area in the frame comprising the first information and the second information.

14. The apparatus of claim 1, further comprising:
a control unit configured to control a frequency reuse rate based on a relative distance from the target sensor node, wherein when the relative distance is greater than or equal to a predetermined value, the decoding unit is configured to perform the wireless cooperative multi-user decoding.

15. The apparatus of claim 1, wherein:
the first communication link comprises a high spectral efficient (HSE) link; and
the second communication link comprises an ultra low power (ULP) link.

16. An interference control system comprising:
a first mobile hub configured to:
determine whether to perform a wireless cooperation with a second mobile hub based on a magnitude of an interference signal from a second sensor node;
receive first information from a first sensor node associated with the first mobile hub via a first communication link;
receive second information from the second mobile hub via a second communication link; and
cancel the interference signal based on the first information and the second information.

17. The system of claim 16, wherein:
the first sensor node is configured to receive a channel number for the first communication link, and to transmit the first information via the first communication link;
the second mobile hub is configured to receive the second information from the second sensor node via the same channel as the first communication link, and to transmit the second information to the first mobile hub via the second communication link; and
the second sensor node is configured to receive the same channel number as the first communication link, and to transmit the second information via the first communication link.

18. The system of claim 16, wherein the first mobile hub is configured to generate a signal in which interference of the second sensor node is cancelled using a multi-user multiple input multiple output (MU-MIMO) reception processing scheme, based on the first information and the second information.

19. The system of claim 18, wherein the first mobile hub and the second mobile hub are configured to detect a signal of the first sensor node and a signal of the second sensor node based on the first information and the second information using one or more receive antennas.

20. The system of claim 16, wherein the first mobile hub is configured to reuse a frequency used for the first communication link when a relative distance from the first sensor node is less than a predetermined value and to reuse a frequency different from the frequency used for the first communication link when the relative distance is greater than or equal to the predetermined value.

21. The system of claim 16, wherein:
the first communication link comprises an ultra low power (ULP) link; and the second communication link comprises a high spectral efficient (HSE) link.

22. An interference control method comprising:
- determining whether to perform a wireless cooperation with a neighboring mobile hub that manages a neighboring sensor node, based on a magnitude of an interference signal from the neighboring sensor node;
- transmitting a channel number to a target sensor node when the wireless cooperation with the neighboring mobile hub is determined to be performed;
- receiving first information from the target sensor node via a first communication link;
- transmitting the first information to the neighboring mobile hub via a second communication link;
- receiving second information from the neighboring mobile hub via the second communication link; and
- performing wireless cooperative multi-user decoding based on the first information and the second information.

23. The method of claim 22, wherein the determining comprises:
- determining whether the magnitude of the interference signal exceeds a predetermined threshold;
- determining whether an interference signal source uses the same type of a protocol as a protocol of an interference control apparatus when the magnitude of the interference signal exceeds the threshold;
- requesting the neighboring mobile hub for the wireless cooperation, and
- determining whether to perform the wireless cooperation based on a state of the neighboring mobile hub when the interference signal source is determined to use the same type of the protocol.

24. The method of claim 22, further comprising:
- transmitting a request signal of a wireless cooperative multipoint (WiCoMP) mode to the neighboring mobile hub when the wireless cooperation is determined to be performed; and
- receiving an acceptance signal of the WiCoMP mode from the neighboring mobile hub.

25. The method of claim 22, wherein the performing of the wireless cooperative multi-user decoding comprises generating a signal in which interference of the neighboring sensor node is cancelled using a multi-user multiple input multiple output (MU-MIMO) reception processing scheme, based on the first information and the second information.

26. The method of claim 22, further comprising:
- determining whether to use the wireless cooperation by comparing a frequency efficiency and a data rate of the first communication link and the second communication link with a predetermined value prior to transmitting the first information to the neighboring mobile hub via the second communication link.

27. The method of claim 22, further comprising:
- cancelling the interference signal using a spreading mode scheme or a duty cycle mode scheme with respect to an interference free area in a frame comprising the first information and the second information,
- wherein the transmitting of the first information comprises transmitting the first information via the second communication link with respect to an interference occurring area in the frame comprising the first information and the second information, and
- the receiving of the second information comprises receiving the second information via the second communication link with respect to the interference occurring area in the frame comprising the first information and the second information.

28. The method of claim 22, further comprising:
- controlling a frequency reuse rate based on a relative distance from the target sensor node,
- wherein the performing of the wireless cooperative multi-user decoding comprises performing the wireless cooperative multi-user decoding when the relative distance is greater than or equal to a predetermined value.

29. The system of claim 22, wherein:
- the first communication link comprises an ultra low power (ULP) link; and
- the second communication link comprises a high spectral efficient (HSE) link.

* * * * *